(No Model.) 3 Sheets—Sheet 2.
W. A. WILDHACK.
TARGET TRAP.
No. 525,640. Patented Sept. 4, 1894.
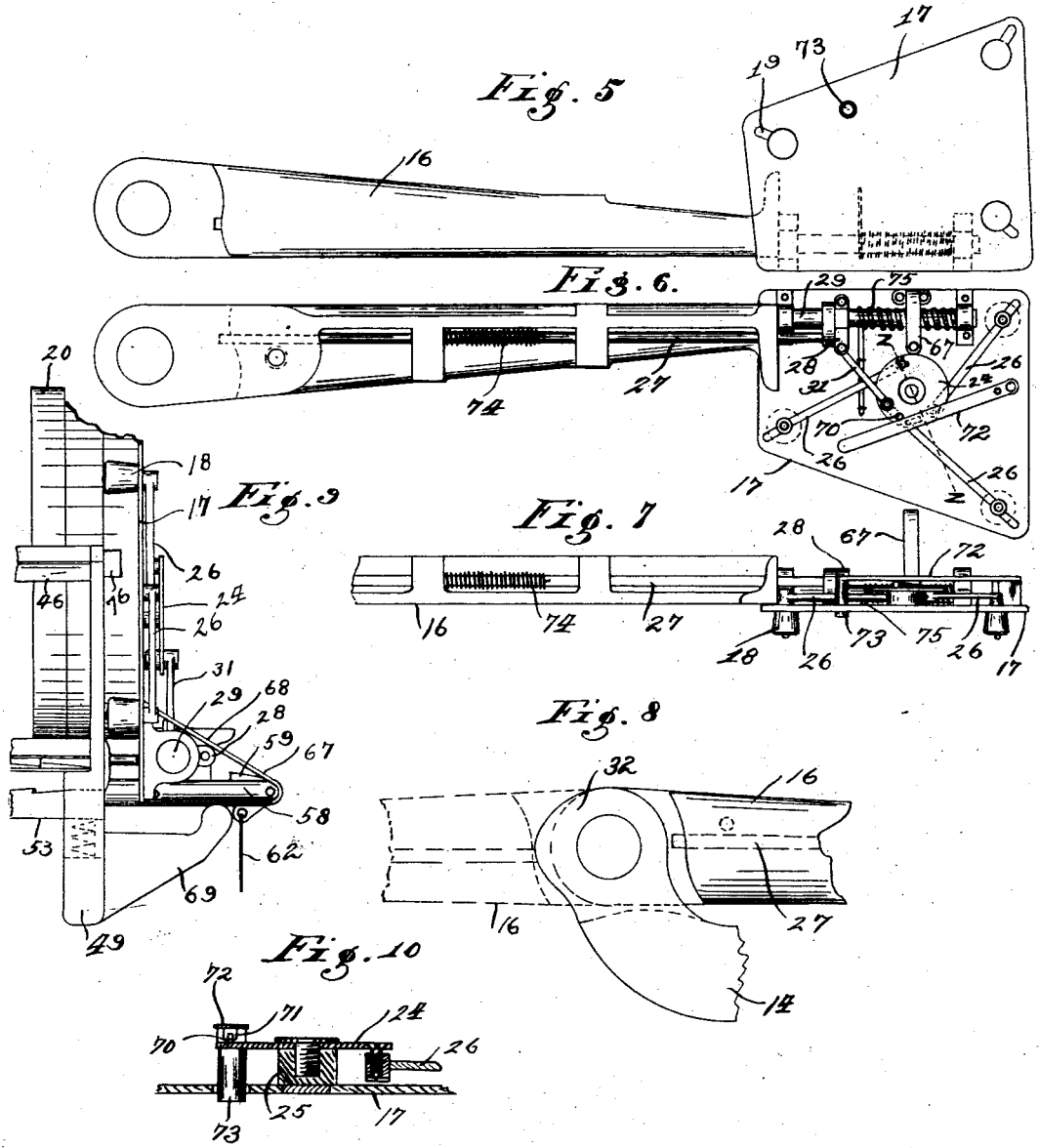

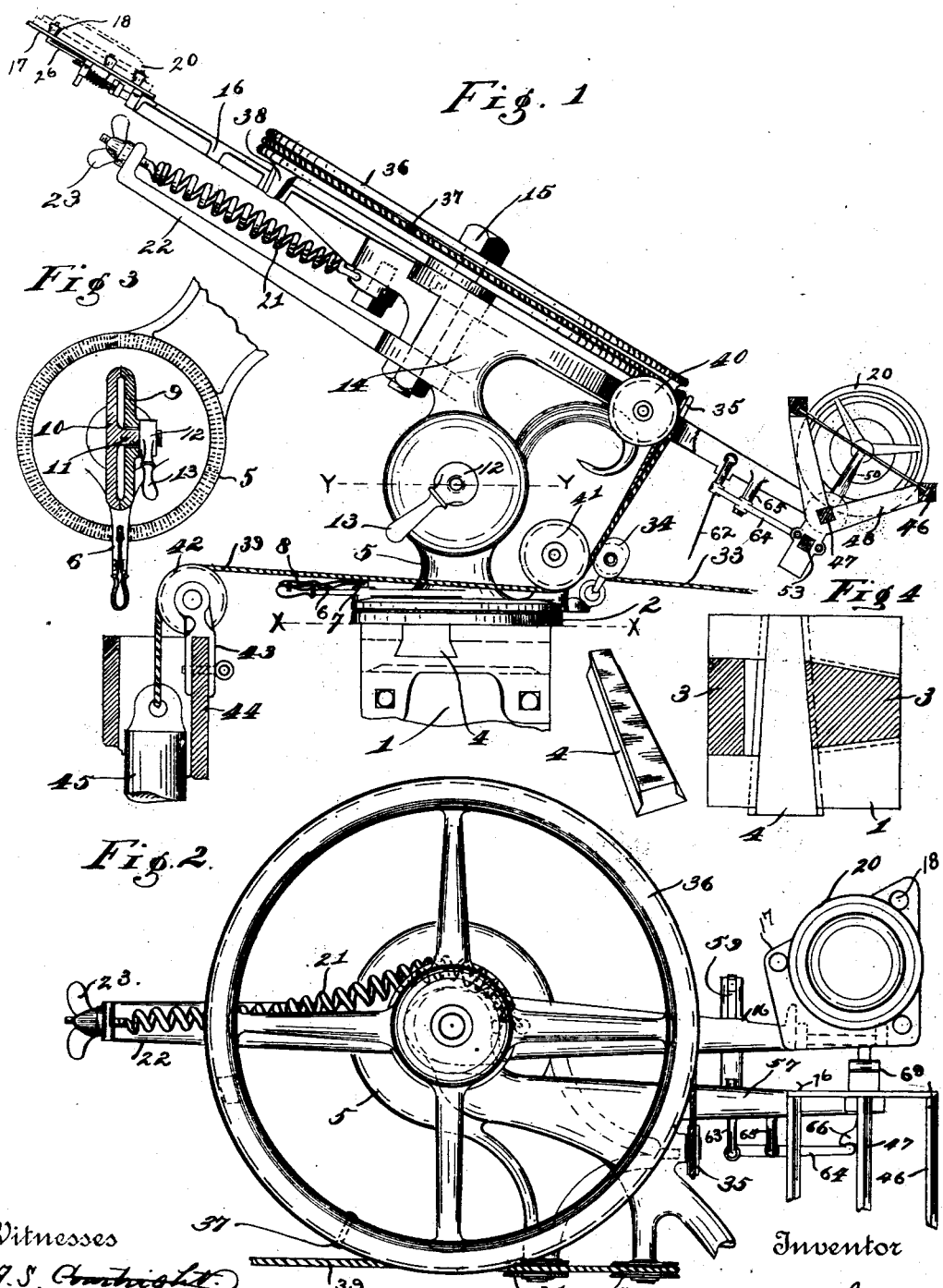

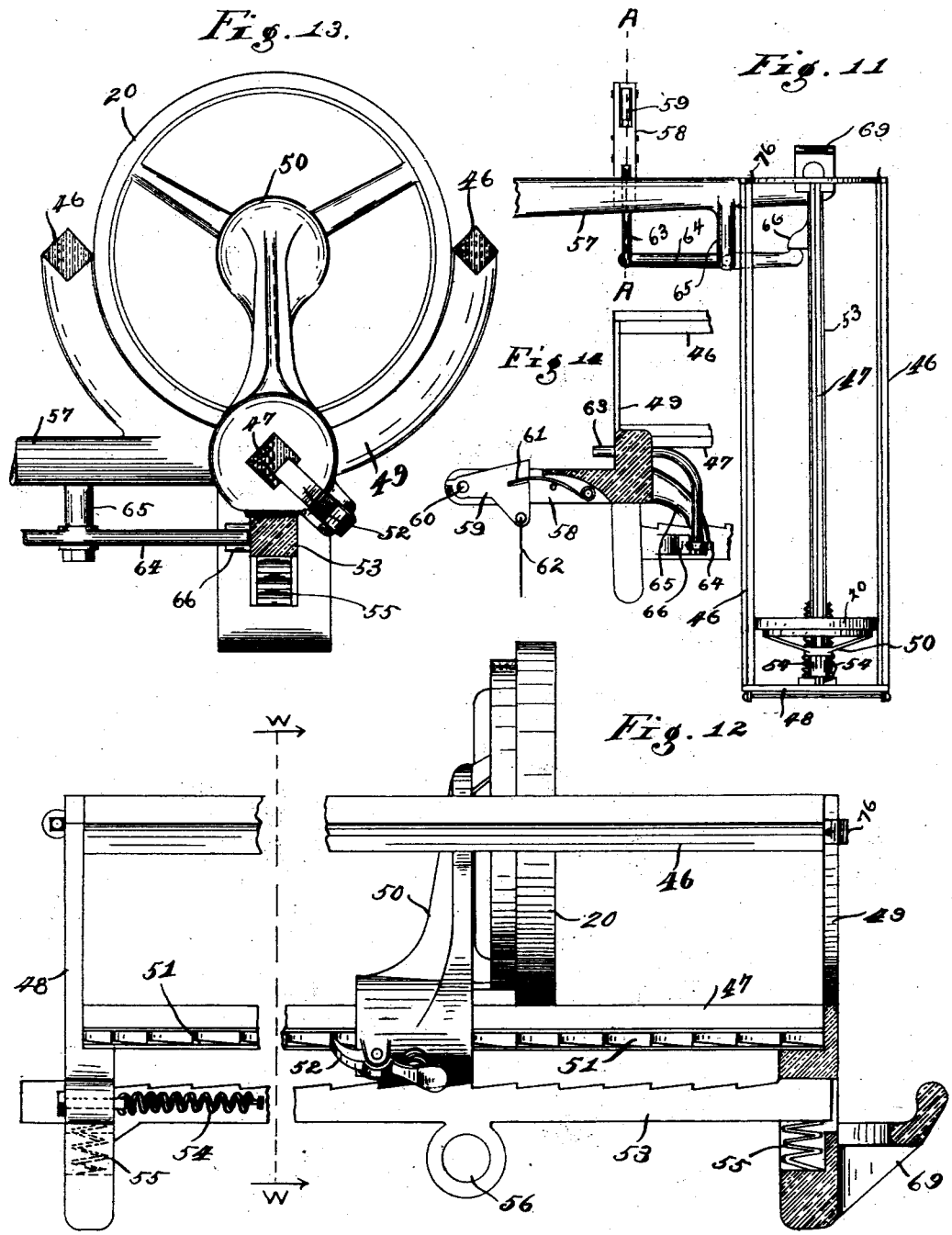

UNITED STATES PATENT OFFICE.

WILLIAM A. WILDHACK, OF INDIANAPOLIS, INDIANA.

TARGET-TRAP.

SPECIFICATION forming part of Letters Patent No. 525,640, dated September 4, 1894.

Application filed June 25, 1894. Serial No. 515,662. (No model.)

*To all whom it may concern:*

Be it known that I, WILLIAM A. WILDHACK, of Indianapolis, county of Marion, and State of Indiana, have invented certain new and useful Improvements in Target-Traps; and I do hereby declare that the following is a full, clear, and exact description thereof, reference being had to the accompanying drawings, in which like numerals refer to like parts.

My invention relates to a bird trap for the purpose of throwing or sailing clay birds, pigeons, &c., used by sportsmen as flying targets.

The novel features of the invention are several, the most prominent probably being the fact that my bird trap is self loading, that is, can be loaded from a distance back where the parties shooting are located. To this end, I provide a magazine rack, or case, adapted to hold a number of birds and a mechanism for feeding these birds to the carrier and operating the carrier as desired.

While what I have just described is the essential novel feature, there are other novel features which will appear from the following description and the drawings forming a part hereof.

Figure 1 is a side elevation of my bird trap, the lower part or support being broken away. Fig. 2 is a plan view of the same, a part of the magazine being broken away. Fig. 3 is a cross section at Y—Y Fig. 1 showing the serrations in the base plate in the dotted lines. Fig. 4 is a cross section on the line X—X of Fig. 1 and includes also one wedge separate. Fig. 5 shows a plan view of the carrier. Fig. 6 is a bottom view of the same. Fig. 7 is a side or edge view of Fig. 6. Fig. 8 is a detail view of the pivotal connection of the carrier and the cam shaped form of the frame. Fig. 9 is a side elevation of the inner end of the magazine containing three birds and showing the carrier turned up on its edge to receive a bird. Fig. 10 is a cross section at Z—Z Fig. 6. Fig. 11 is a plan view of the magazine. Fig. 12 is a side elevation of the same, part being broken away and the front part being in vertical section. Fig. 13 is a sectional view on the line W—W, Fig. 12. Fig. 14 is a cross section of the trap mechanism at A—A, Fig. 11.

Upon a suitable support such as the post 1 there is detachably secured a base plate 2 whereby the bird trap may be readily removed. The trap is securely mounted upon such support or post by forming the upper end of the post and the base plate 2 as shown in Figs. 1 and 4, the post being provided with two grooves crossing each other and each adapted to receive a wedge, making what I term a dove tail attachment. The parts of the wedge 3 are integral with the base plate 2 extending downward therefrom and adapted to fit in the groove. The wedge 4 is a separate wedge or key that enters a suitable groove crosswise in the post 1 and between the two parts of the wedge 3. As the wedge or key 4 is driven in, it pushes the wedge 3 forming a part of the base plate 2 securely into its seat. By its construction, the trap is firmly mounted and yet is readily detachable by withdrawing the wedge 4.

5 is a turntable suitably mounted on the base plate 2 so as to be securely attached to it but at the same time be rotatable. Secured to the turn table 5 is a small lever 6 provided with a pawl 7 which operates through a slot in the lever 6 to engage teeth or serrations on the upper surface of the base plate as shown in the dotted lines in Fig. 3.

8 is a spring actuated finger lever for actuating such pawl 7. By this means I am enabled to turn the turn table 5 and thereby turn the trap so as to throw the bird in any direction I desire. When the finger lever 8 is pressed down the pawl disengages the teeth on the base plate 2 allowing such rotation and when the finger lever 8 is released the spring under it will cause it to force the pawl 7 down into engagement with the teeth in the base plate and thereby hold the trap in proper position.

On the upper end of the turn table 5 is a circular vertically disposed plate or jaw 9 adapted to be engaged by a corresponding rotatable plate or jaw 10 mounted in the stationary plate 9 by means of a threaded stub axle 11. On the end of this stub axle is secured a nut 12 with a handle 13 forming a part thereof. The plate 10 is integral with the trap frame 14 and the nut 12 by being operated clamps the two plates 9 and 10 together but releases them as desired whereby the trap may be set at such vertical angle as is desired.

Extending through the trap frame 14 is a bolt and nuts 15 on which is mounted the carrier arm 16 being pivoted at one end. On the outer end of this carrier arm is the carrier 17 consisting of a plate with three fingers, lugs or holders 18 extending up through slots 19 in the plate. This carrier is adapted to receive a bird 20 as seen in Fig. 2 and the fingers 18 to hold it. The carrier arm 16 is actuated by the strong spring 21 mounted on the arm 22 by means of the set screw 23 whereby the tension of the spring may be adjusted. When the trigger or trip holding the carrier arm is released the spring 21 by tension rotates the arm about its pivotal bolt 15 with great force changing from the position shown in Fig. 2 to that shown in Fig. 1. When the arm reaches the position shown in Fig. 1 the action of the spring on the arm ceases and the bird is thrown from the position shown in Fig. 1.

The bird is released when it reaches the position shown in Fig. 1 by the following mechanism: On the under side of the carrier 17 as seen in Fig. 6 is found a rotatable plate 24 which turns upon the shaft 25 and which has pivotally secured on its upper side between it and the under side of the carrier arm the inner ends of the bars 26 which at the outer ends are secured to the fingers 18 which hold the bird. In the carrier arm 16 there is mounted a longitudinally movable rod 27 extending from near the pivotal point of the carrier arm to the movable collar 28 mounted on the shaft 29 on which the carrier plate is mounted. Secured to the movable collar 28 is a link 31 that is attached to the under side of the rotatable plate 24. At the pivotal connection of the carrier arm 16, there is formed a cam 32 on a part of the frame work as seen in Fig. 8 when the carrier arm has been moved from the position shown in Fig. 2 or in heavy lines in Fig. 8 to the point of discharge shown in Fig. 1 or by the dotted lines in Fig. 8, it will be observed that the cam engages the rod 27 pushing it outward thereby pushing the collar 28 and the link 31 and rotating the plate 24 which in turn actuates or pushes the three bars 26 causing the fingers 18 to be pushed outward, thereby releasing the bird 20. By this construction the bird is released at the time it should be discharged. After the bird has been discharged the carrier is rotated back to the position shown in Fig. 2 by means of the rope 33 that extends back to where the operators are located and passes under the block and tackle 34, over the pulley 35 in the groove about the wheel 36 that is mounted on the bolt 15 independent of the carrier arm and is secured to such wheel at 37. When this rope is pulled the wheel 36 is rotated so that the lug 38 carries about with it the carrier arm until it reaches a position shown in Fig. 2. Whenever this rope is released, the wheel 36 is turned backward to the position shown in Fig. 1 by means of the rope 39 which is connected to the wheel at 37, and passes over the pulley 40 on the trap frame 14 and under the pulley 41 on the turn table 5 and over the pulley 42 mounted in the bracket 43 that is detachably secured to a box 44, the rope having at its end a weight 45 suspended. This weight draws the wheel 36 back so that the lug 38 will be out of the way of the action of the carrier arm when the next bird is thrown.

On a branch of the trap frame 14 is mounted a magazine or rack adapted to hold a number of birds. The form which I have used consists of three horizontal bars, two upper ones 46 and one lower one 47 placed in relation to each other as shown in Fig. 13 and mounted in the two end frames 48 and 49. These bars form a rack to hold the bird and preferably present an edge for the bird to bear against or rest upon as shown in Fig. 13. This is to reduce friction in the movement of the birds in the rack or magazine. The birds are fed to the end of the magazine or rack where the carrier receives them by means of a movable feed plate 50 mounted on the bar 47 so as to slip on it, being located behind all the birds and will feed them forward as it is pushed. To prevent its moving backward, I provide a rack 51 on one side of the bar 47 adapted to be engaged by a spring actuated pawl 52 on the feed plate 50. The feed plate 50 is directly actuated by the feed rack bar 53 which is movably mounted in the lower part of the end frames 48 and 49 as seen in Fig. 12. When the mechanism hereinafter described moves the rack bar 53 one notch and ceases to operate on it the springs 54 draw it back into the position shown in Fig. 12. The rack bar is preferably supported by the springs 55 so that when the feed plate 50 has fed all the birds out said feed plates can be moved back to the other end of the magazine or rack by pulling down on the finger piece 56, thus disengaging the rack bar 53 from the feed plate 50. With the other hand the spring pawl 52 is disengaged from the rack 51 and the feed plate 50 shoved back to the other end. Springs 76 are placed on the ends of the bars 46 to prevent the forward bird falling out of the magazine until it is forced out by the feed mechanism.

On the stationary arm 57 extending from the trap frame 14 and supporting the magazine frame is mounted the bracket 58 having on its outer end a trigger 59 pivoted at 60 and supported by the spring 61 and operated by the wire rope 62 which extends back to the sportsmen or operators of the device. When the carrier arm is turned back in the position shown in Fig. 2 by pulling on the rope 33, it engages the push rod 63 mounted in such arm 57 of the frame and by pushing such rod operates the lever 64 which is centrally pivoted to the arm 65 whereby the other end of such lever will engage the lug 66 on the side of the feed rack bar 53 and move such rack bar one notch causing one bird to be fed out of the magazine. As the rope 33 is released, the carrier arm 16 returns slightly until it engages the trigger 59 as seen in Fig. 2, and the springs 54 draw back the rack bar 53 and moves the push rod 63 back in place as shown in Fig. 11.

When the carrier arm is drawn back so as to contact with the push rod 63 it at the same time caused the arm 58 which extends downward under the carrier plate and which is braced by the brace 68 to contact with the trip lug 69. As the rope 33 is further drawn backward causing the carrier arm to push the push rod 63 backward, the force causes the carrier plate 17 to be turned upward into a vertical position as seen in Fig. 9, so that the upper side of such carrier plate will be in a position to receive the bird as it is fed forward. As has just been stated, just as that occurs, the push rod 63 has been pushed back and the bird fed forward. When the mechanism which is shown in Fig. 6 is actuated by the rod 27 and the cam 32 so as to free the bird, the pin 70 on the plate 24 moves far enough to be engaged by the lug 71 on the under side of the spring bar 72 shown in Figs. 6 and 10, thus holding the parts in the position they assume when they throw the bird. When the bird is fed into the carrier as has just been described, it presses upon the movable pin 73 which extends through the carrier plate 17 and is connected to the spring bar 72, pressing back such spring bar until the lugs 71 disengages the pin 70 whereby the coil tension spring 74 on the sliding rod 27 pulls such rod and all the parts backward into the position shown in Fig. 6 and this causes the fingers 18 to grasp and hold the bird. At this point, the rope 33 being released and the carrier arm moving back by reason of its spring 21 against the trigger 59 in the position shown in Fig. 2. The carrier plate 17 is drawn down from the position shown in Fig. 9 to that shown in Fig. 2 by reason of the spring 75 which is coiled about the rod 27 having its front end extending out and secured to the under side of the carrier plate 17 as seen in Fig. 6. This spring immediately draws such carrier plate down into a horizontal position and now the bird is fed into the carrier plate and is ready to be thrown. It is thrown merely by pulling the wire 62 thus causing the trigger 59 to release the carrier arm 16. Then, the process as I have described it in describing the device is repeated until all the birds have been discharged, when the magazine is filled again.

From the foregoing description, I think the construction will be understood and it will be seen that the machine will operate just as described; the feeding of the birds will be regular because they are all made of a uniform size.

There are other and equivalent forms of constructing various parts of my device which it is needless for me here to point out. I have illustrated the principle and mode of operation and what has seemed to me the best form of carrying out the principle I had in view. Hence, I do not desire to limit myself to the specific construction herein shown and described.

What I claim as my invention, and desire to secure by Letters Patent, is—

1. In a target trap, a bird magazine, a feed plate movably mounted in such magazine, a feed bar engaging such feed plate, a spring actuated carrier arm pivoted in the frame work of the trap, a bird carrier mounted on such arm, and a lever mechanism connected to the feed bar and located to be actuated by the carrier arm when it is moved into position for loading, substantially as shown and described.

2. In a target trap, a bird magazine, a feed plate movably mounted therein behind the birds, a rack on such magazine, a spring pawl mounted on the feed plate engaging such rack, a spring supported feed rack bar engaging such feed plate, a spring actuated carrier arm pivoted in the trap, a bird carrier on such arm, and a lever mechanism connected with such feed rack bar and located to be actuated by the carrier arm when it is moved into position for loading, substantially as shown and described.

3. In a target trap, a bird magazine, a feed plate movably mounted therein, a rack on such magazine, a spring pawl mounted on the feed plate engaging such rack, a spring supported rack bar engaging such feed plate, a spring connected with such feed rack bar to withdraw it in normal position after it has been operated and released, a carrier arm pivoted in the trap, a bird carrier mounted on such carrier arm, a lever centrally pivoted to an arm of the trap frame and connected with the feed rack bar, and a push rod mounted in such arm of the trap frame and actuated by the carrier arm when it is moved into position for loading, substantially as shown and described.

4. In a target trap, a bird magazine, a spring actuated carrier arm pivoted in the trap frame, a bird carrier rotatably mounted on such carrier arm, and a trip lug secured to the magazine engaging the bird carrier when it is moved into position for loading and turn the same against the end of the magazine, and means for feeding a bird into such carrier, substantially as shown and described.

5. In a target trap, a carrier arm pivoted in the trap frame, a horizontally disposed carrier plate rotatably mounted on the outer end of such arm, a projection depending from such carrier plate, a trip lug on the magazine located to engage such projection when the carrier plate is moved in position for loading as to cause such plate to assume a vertical position against the end of the magazine, and a mechanism for feeding the birds successively to the carrier plate, substantially as shown and described.

6. In a target trap, a suitable carrier arm, a bird carrier consisting of a plate provided with radially extending slots, fingers extending through such slots, and means for moving such fingers outward when a bird is to be discharged, substantially as shown and described.

7. In a target trap, a carrier arm pivoted therein, a carrier plate mounted on such arm, provided with radially extending slots, fingers extending up through such slots, a rotatable plate centrally mounted beneath such carrier plate, bars connecting the fingers to the rotatable plate, a reciprocable rod mounted in the carrier arm, a link connecting one end of such reciprocable rod to the rotatable plate, and a cam in the trap frame engaging the other end of such reciprocable rod, substantially as and for the purpose shown and described.

8. In a target trap, a bird carrier comprising a plate provided with radially extending slots, fingers extending up through such slots, means for moving such fingers outward when a bird is to be discharged, a lock for holding such fingers in an outward position until a bird is fed into the carrier, a spring trip connected with such lock and located to be actuated by the bird that is fed into the carrier, whereby such lock will be released, and a spring actuated mechanism connected with such fingers whereby they will be caused to grasp the bird, substantially as shown and described.

9. In a target trap, a carrier arm pivoted in the trap frame, a carrier mounted on the end thereof consisting of a plate provided with radially extending slots, a rotatable plate centrally mounted on such carrier, bars connecting such fingers to such rotatable plate, a reciprocable rod mounted in the carrier arm, a link connecting such rod with the rotatable plate, a cam in the trap frame engaging such reciprocable rod whereby the fingers will be pushed outward when a bird is to be discharged, a spring bar mounted in such carrier plate, a lock for locking the rotatable plate to the spring bar and thereby hold the fingers in an outward position until a bird is fed to the carrier, a pin on such spring bar extending up through the carrier plate whereby it will be engaged by a bird as it is fed into the carrier, and a spring on such reciprocable rod whereby the fingers will be caused to grasp the bird, substantially as shown and described.

10. In a target trap, a spring actuated carrier arm pivoted in the trap frame, means for withdrawing the same after it has been operated, a spring controlled bird carrier rotatably mounted on the outer end of such carrier arm, a bird magazine, means for feeding the birds successively from the magazine to the carrier, and a trip on the magazine located to engage the bird carrier when it is approaching the magazine for loading and turn the same up against the end of the magazine, substantially as shown and described.

11. In a target trap, a spring actuated carrier arm pivoted in the trap frame, a bird carrier mounted on the outer end thereof, a bird magazine, means for feeding the birds successively to the carrier, means of withdrawing the carrier arm for loading, a horizontal bracket on an arm of the trap frame, a push rod mounted in such arm of the trap frame where it will be actuated by the carrier arm when it is turned back for loading, means actuated by such push rod for operating the feed mechanism of the magazine, a spring controlled trigger mounted on the end of such horizontal bracket against which the carrier arm is lodged after the carrier has been loaded, and means of operating such trigger whereby the carrier arm is released, substantially as shown and described.

12. In a target trap, a frame suitably mounted, a carrier arm pivoted to a bolt in such frame, a sheave wheel mounted on such bolt provided with a lug on its under side located to engage the carrier arm, a rope secured to such wheel and operating in its peripheral groove and extending over suitable pulleys whereby the carrier arm may be withdrawn for loading, and means of returning such wheel to its normal position after the rope has been released, substantially as shown and described.

13. In a target trap, a suitable frame, a bolt extending up through such frame, a carrier arm mounted on such bolt, a sheave wheel mounted on such bolt provided with a lug on its under side to engage the carrier arm, a rope secured to the wheel operating in its peripheral groove and over suitable pulleys whereby the carrier arm is withdrawn for loading, another rope secured to such wheel and extending over suitable pulleys, a weight connected to such last mentioned rope, and a box located near such trap in which such weight can operate, substantially as shown and described.

In witness whereof I have hereunto set my hand this 8th day of June, 1894.

WM. A. WILDHACK.

Witnesses:
ALBERT S. COURTRIGHT,
LELA A. MONROE.